June 25, 1963      A. CHASE      3,095,337

SEMICYLINDRICAL FOAM ELASTOMER INSULATION SHELL

Filed July 10, 1961

INVENTOR
ASCHER CHASE

BY *Abraham A. Saffitz*

ATTORNEY

3,095,337
SEMICYLINDRICAL FOAM ELASTOMER INSULATION SHELL

Ascher Chase, Portsmouth, Va., assignor to General Foam Plastics Corporation, a corporation of Virginia
Filed July 10, 1961, Ser. No. 122,942
1 Claim. (Cl. 154—45)

This invention relates to a novel foamed elastomer semicylinder of integral molded construction for insulating elongated tubular members such as pipes, which is structurally adapted to interfit along its entire longitudinal edge with another identical overlying semicylinder by tongue-in-groove and is further structurally adapted to interfit in paired assembly at the end circular face of the pair to an adjacent paired assembly by a flanged projection at one end of the pair being inserted into a recess at the abutting end of an adjacent identical pair. In this manner, self-interlocking simultaneously occurs at the end flanges and recesses of assembled pairs and at the tongue-in-groove longitudinal mating edges of the semicylinders of the pairs with the flange and recess interengagement between adjacent shell pairs reinforcing the tongue-in-groove locking thereby providing an endless length of insulation covering of substantial thickness to eliminate the need for external strapping.

Heretofore cylindrical foam plastic insulation has either been locked in place on the pipe by means of external strapping or has been adhered to the pipe by suitable adhesive to provide a permanent assembly. For example, Jaye in U.S. Patent No. 2,717,848 shows foamed polystyrene sections which are adhesively coated in order to be permanently secured to the pipe. Also patent to MacCracken, U.S. Patent No. 2,936,792, shows foamed polyurethane tubular insulation which is strapped to permanently affix the insulation to pipe.

The integral molded semicylindrical insulation in accordance with the present invention eliminates the need for adhesive engagement or for strapping to firmly fix the insulation in place about the pipe and possesses the advantage that it may be easily disassembled to permit inspection, maintenance and repair of the pipe and may be reused without in any way requiring any additional securing means, e.g., adhesive or straps.

The dual reinforcement of interengagement of the semicylindrical shell halves of the novel insulation is provided during the molding operation using known procedures and known foam elastomer materials. The integral semicylindrical shell is made up of a uniformly thick inner shell portion and a uniformly thick outer shell portion with the outer and inner shell portions meeting at a common longitudinal edge. One of the longitudinal edges of the outer shell portion is formed with a raised bead or tongue along its entire length to form a tongue. Along the opposite longitudinal edge of said same shell there is formed a corresponding recess or groove along the entire longitudinal edge. The tongue is about midway between the sides of its longitudinal edge and the groove is also midway between the sides of its longitudinal edge. Effectively, the shell half complements an identical shell half, superposed and reversed in tongue and groove interfit along a line midway between each of the sides of each interfitting longitudinal edge of the outer shell portion.

Extending inwardly from the outer shell portion, the inner shell portion of the molded integral semicylinder has a projecting flange at one end of the shell and a corresponding or complemental recess at the other end of the flange so that adjacent paired shells interfit along their longitudinal edges by the projecting tongue in groove bead. The inner circular projecting flange at one end of said paired shells engages the circular inner recess of the adjacent pair of shells, the recess being substantially equal in depth to the projecting length of flange at the opposite end of each semicylindrical shell.

For efficient heat insulation of the various sizes of pipe against extremes of temperature encountered in commercial and home use, the thickness of the inner and outer shell portions of the foamed elastomer cylinders is at least about ½ inch and preferably up to about 2½ inches overall thickness with the inner abutting shell portions in longitudinal interfitting array forming a continuous inner skin and the outside edge thickness of the outer shell portion being about 1.5 to 2.5 times the outside edge thickness of the inner shell portion.

The foamed elastomer is readily prepared in a suitable semicylindrical forming mold to provide the material having a density of about 0.1 down to about .04 as compared to water which has a density of 1, the cells of the elastomer being closed and being very thin, e.g., of the order of about 0.1 to .001 millimeter in diameter. A continuous outer strong skin much thicker than the average cell thickness, e.g., up to several millimeters in thickness, is provided during the molding operation so that the inner and outer surfaces of the cylindrical insulation are resistant to breakage.

Because of the flexibility of the foamed elastomer material and its inherent compressibility based on its closed cell, lightweight structure, the end-to-end flange-recess locking is highly effective to permanently anchor the assembled insulation about pipe. The projecting end flanges extending a distance of as little as ½ inch from a relatively long length of several feet can be compressed by the adjacent circular end recess to anchor the adjacent sections firmly along the compressed contacting end surfaces of the flange in recess connection.

Foamed polystyrene is outstanding as the elastomer material for molding the novel semicylindrical insulation of the invention based upon its low cost, its ease of molding and its excellent insulating and mechanical properties. Framing in the mold follows conventional procedures such as are disclosed in Stastny et al., U.S. Patent No. 2,744,291 granted May 8, 1956, or in Munters et al., Patent No. 2,023,204 granted December 3, 1930, or in Ott, Patent No. 2,532,242.

Closed cell flexible polyurethane foams which are somewhat more heat resistant may be used for use where the pipe is filled with fluid at elevated temperature. Foamed closed cell polyvinyl chloride or foamed vinyl chloride copolymer starting from paste may be used, the known processes of Elastomer Chemical Company or of Dennis Chemical Company being examples of known methods of making and molding this foam elastomer type. Flexible urea-formaldehyde polymer foam may also be used. All of these foams are readily made in the same density range as foamed polystyrene. The foamed elastomer material is formulated in conventional manner to include flame-resistant additives so that the elastomeric product will be heat resistant, will not support combustion and will still provide the physical strength properties and tough surface skin to withstand rough handling.

The invention is further illustrated in the accompanying drawing in which

Figure 3:
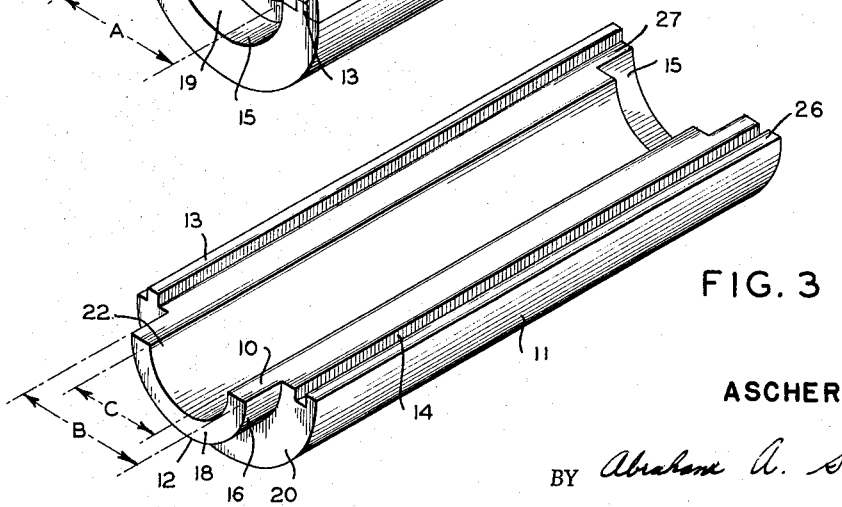
FIG. 3 is a top and perspective view of a semicylindrical shell illustrating the several details of end-to-end and longitudinal edge-to-edge interlocking.

In FIG. 3 the semicylindrical shell of foam elastomer, preferably polystyrene, is a unitary molded shell formed of outer shell portion 11 and inner shell portion 10, the outer shell portion 11 being thicker than the inner shell portion 10, the outer thickness of the outer shell portion 11 being about 1.5 to 2.5 times the outer thickness of the inner shell portion 10 thereby providing a substantial overall thickness of up to about 3–4 inches for larger pipe sizes. The inner shell portion 10 projects at one end beyond the edge of the outer shell portion to form flange 12 of semicylindrical shape, its outer edge thickness at end 18 defining the inner shell portion thickness. This flange projection 12 extending from the inner shell portion 10 may extend beyond the edge of face 20 of the outer shell 11 in an amount as little as ½ inch up to about 1½ inches in the shell insulation of about 2 inches overall edge thickness, used for insulating 2 inch pipe. In use for smaller sizes of pipe the overall edge thickness at the longitudinal edge may vary down to about ⅝ inch and with larger pipe this edge thickness of the insulation may be up to 3–4 inches but for most ordinary uses insulation averaging 1½–2½ inches in thickness provides complete insulation protection to withstand extremes of temperature in the metal pipe as compared to ambient temperature.

Figure 1:
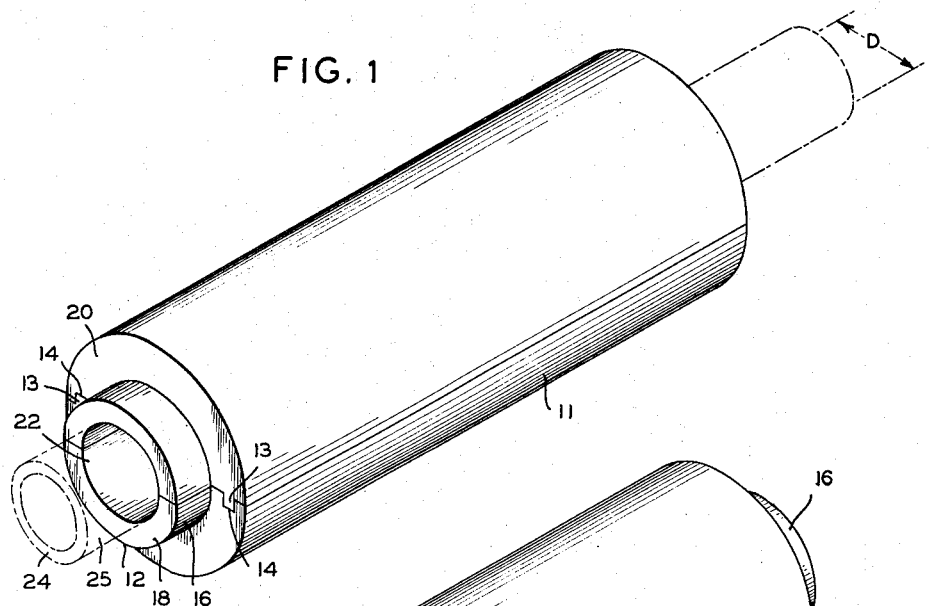
FIG. 1 shows a perspective view of the semicircular shell insulation construction of the invention with two shells in interfitting relation and illustrating the flange end of a hollow cylinder unit surrounding a pipe.
Figure 2:
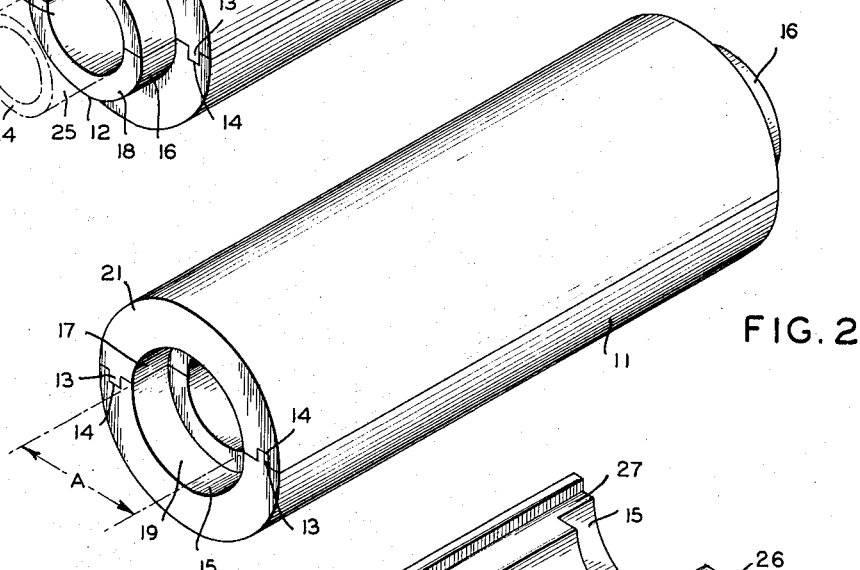
FIG. 2 shows a perspective view of the semicircular shell insulation construction of the invention with the two shells in interfitting relation to illustrate the recess end of the hollow cylindrical unit.

Corresponding to the outer dimensions of the projecting flange 12 there is molded at the opposite end of the inner shell portion a semicylindrical recess 15, which, with a superposed shell as shown in FIGS. 1 and 2, is adapted to receive the projecting flange portion 12 in end-to-end relation for compressive flange-in-recess abutment of adjacent pairs of mating halves. This compressive flange-in-recess abutment firmly fixes the cylindrical insulation formed of mating halves above the pipe such as metal pipe, in tight relation and this tight engagement dispenses with the need for additional securing means such as straps or adhesive while permitting ready disassembly and reuse of the insulation for inspection, maintenance and repair of the pipe. The outer dimensions of the flange 12 are substantially equal to the inner dimensions of the recess 15 so that slight compression is necessary, the foamed closed-cell styrene elastomer being sufficiently flexible to easily force the outer end perpendicular face 16 of the flange into complete surface-contacting relation with the inner perpendicular facing 25 of the recess 15 so that a mechanically tight abutment is achieved, the extension of the outer shell portion at the recess serving to cover these faces for more effective insulation.

As shown in FIG. 3, a bead 13 forming a tongue is formed along the entire longitudinal edge face of the shell and is adapted as shown in FIGS. 1 and 2 to fit into groove 14 on the longitudinal edge of the superposed shell 11 of identical construction. Each semicylinder 11 is thus formed with the bead 13 along the entire length of one longitudinal edge and a groove along the entire longitudinal other edge. In superposed relation the shells 11 coact in tongue and groove interlock to form a cylindrical insulating tube, circularly recessed at one end and with projecting circular flange at the other end for end-to-end interfitting at recess end 19 with inner flange end 20, the overlap of the outer shell effectively excluding outside air from entering the contacting abutting surfaces.

The bead 13 is located about midway between the edges (at the flange) of the outer edge portion making for improved tongue-in-groove interfitting along the longitudinal groove 14 placed also midway between the sides of the opposite longitudinal edge.

The diameter C of the inner insulator recess 23 (bounded by the inner insulator wall 22) approximately equals the diameter of the pipe to be inserted in this recess. Due to the approximate equality of the inner insulator recess diameter C and the outside pipe diameter and the compressibility of the insulator substance, pressure is effected between the outside pipe wall 25 and the inner insulator wall 22. This results in a tight fit between the insulator and the pipe 25.

As shown in FIG. 3, the outer longitudinal flat edge 26 of the outer shell portion on the outside edge of the tongue 13 lies in the same plane as the inner longitudinal flat edge on the inner edge of the tongue 13 thereby providing a tight mechanical joint as shown in FIG. 2.

Similarly, the longitudinal edge portions of the inner shell are also in the same plane.

While I have shown and described but a single embodiment of my invention, it is to be understood that it is capable of many modifications. Changes, therefore, in the construction and arrangement may be made which do not depart from the spirit and scope of the invention which is disclosed in the appended claim.

I claim:

A molded, integral insulation construction of foamed closed uniform cell elastomer having a continuous outer strong resilient skin much thicker than the average cell diameter made up of a uniformly thick semicylindrical inner shell portion and a uniformly thick semicylindrical outer shell portion, said outer and inner portions meeting at a common longitudinal edge, said outer shell portion having a raised bead forming a tongue along the entire length and midway between one longitudinal edge and having a groove whose depth is substantially equal to the height of said tongue along the entire length and midway between the other longitudinal edge, the thickness of said outer shell portion being about 1.5 to 2.5 times the thickness of said inner shell portion and the inside diameter of said outer shell portion being equal to the outside diameter of said inner shell portion, said inner shell portion being substantially equal in length to said outer shell portion and resting inside said outer shell portion with one end of said inner shell portion projecting past one end of said outer shell portion, thereby forming a circumferential flange at one end of the insulation construction, and being circumferentially recessed at the other end of the same shell portion with the recess being substantially equal in depth to the length of the flange projecting from the opposite end of the semicylindrical shell construction, said semicylindrical shell construction being joined by circumferential flange-in-recess and longitudinal tongue-in-groove to another identical insulation construction to form a hollow, endless cylindrical insulation to snugly embrace an elongated tubular member and said insulation being thus joined end-to-end to identical cylindrical structures by inserting the end circumferential flange into the recess of interfitting paired shell halves.

References Cited in the file of this patent

UNITED STATES PATENTS

| | | |
|---|---|---|
| 102,116 | Harris et al. | Apr. 19, 1870 |
| 1,002,932 | Richards | Sept. 11, 1911 |
| 2,602,764 | Billingham | July 8, 1952 |
| 2,717,848 | Jaye | Sept. 13, 1955 |
| 2,784,129 | Stephens | Mar. 5, 1957 |
| 2,872,947 | Isenberg | Feb. 10, 1959 |
| 2,936,792 | MacCracken et al. | May 17, 1960 |